(12) United States Patent
Tobella

(10) Patent No.: US 10,132,518 B2
(45) Date of Patent: Nov. 20, 2018

(54) CONTROLLER FOR A THERMAL APPLIANCE

(71) Applicant: BRITISH GAS TRADING LIMITED, Windsor, Berkshire (GB)

(72) Inventor: Andreu Tobella, Windsor (GB)

(73) Assignee: British Gas Trading Limited, Windsor, Berkshire (GB)

( * ) Notice: Subject to any disclaimer, the term of this patent is extended or adjusted under 35 U.S.C. 154(b) by 76 days.

(21) Appl. No.: 15/304,026

(22) PCT Filed: Apr. 14, 2015

(86) PCT No.: PCT/GB2015/051133
§ 371 (c)(1),
(2) Date: Oct. 13, 2016

(87) PCT Pub. No.: WO2015/159069
PCT Pub. Date: Oct. 22, 2015

(65) Prior Publication Data
US 2017/0030604 A1    Feb. 2, 2017

(30) Foreign Application Priority Data

Apr. 14, 2014 (GB) .................................. 1406685.6

(51) Int. Cl.
*F24F 11/00* (2018.01)
*G05B 15/02* (2006.01)
(Continued)

(52) U.S. Cl.
CPC .............. *F24F 11/30* (2018.01); *F24F 11/62* (2018.01); *G05B 15/02* (2013.01);
(Continued)

(58) Field of Classification Search
CPC .. F24F 11/0012; F24F 11/0034; F24F 11/006; F24F 11/0076; F24F 2011/0035;
(Continued)

(56) References Cited

U.S. PATENT DOCUMENTS

2011/0231020 A1    9/2011  Ramachandran et al.
2011/0238222 A1*   9/2011  Nikovski ............... F24F 11/006
                                                                    700/276
(Continued)

FOREIGN PATENT DOCUMENTS

GB            2372263 A2    10/2011

OTHER PUBLICATIONS

Search Report in corresponding GB Application 1406685.6, dated May 25, 2016.
(Continued)

*Primary Examiner* — Yuhui R Pan

(57) ABSTRACT

A controller for a thermal appliance configured to heat or cool an area of a premises. The controller comprises: a communications interface, configured to communicate over a communications network; a data store comprising information regarding a transport infrastructure; and a processor coupled to the data store and to the first communications interface. The processor is configured to obtain an estimate of the time for a user carrying a mobile device to return to the premises via the transport infrastructure.

20 Claims, 3 Drawing Sheets

(51) Int. Cl.
   *F24F 11/30* (2018.01)
   *F24F 11/62* (2018.01)
   *G05D 23/19* (2006.01)
   *H04L 12/28* (2006.01)

(52) U.S. Cl.
   CPC ..... *G05D 23/1905* (2013.01); *H04L 12/2829* (2013.01); *H04L 2012/285* (2013.01)

(58) Field of Classification Search
   CPC ....... F24F 2011/0063; F24F 2011/0068; F24F 2011/0073; G05B 15/02; G05D 23/1905; H04L 12/2829; H04L 2012/285
   See application file for complete search history.

(56) References Cited

U.S. PATENT DOCUMENTS

| | | | |
|---|---|---|---|
| 2011/0288936 A1* | 11/2011 | Cumming | G06Q 30/0261 705/14.58 |
| 2012/0172027 A1 | 7/2012 | Partheesh et al. | |
| 2013/0344905 A1* | 12/2013 | Kim | H04W 4/12 455/466 |
| 2014/0031989 A1 | 1/2014 | Bergman et al. | |
| 2014/0277762 A1* | 9/2014 | Drew | F24F 11/0086 700/276 |
| 2015/0185721 A1 | 7/2015 | Deilmann et al. | |

OTHER PUBLICATIONS

Search Report in divisional GB application 1612272.3, dated Sep. 20, 2016.
International Search Report and Written Opinion for PCT/GB2015/051133, dated Jul. 23, 2015.
Search Report for corresponding Application No. GB14066856, dated Sep. 30, 2015.
Honeywell, 2014, Honeywell Lyric Thermostat, Honeywell.com, [online], Available from: http://lyric.honeywell.com/ [Accessed Sep. 14, 2015].

* cited by examiner

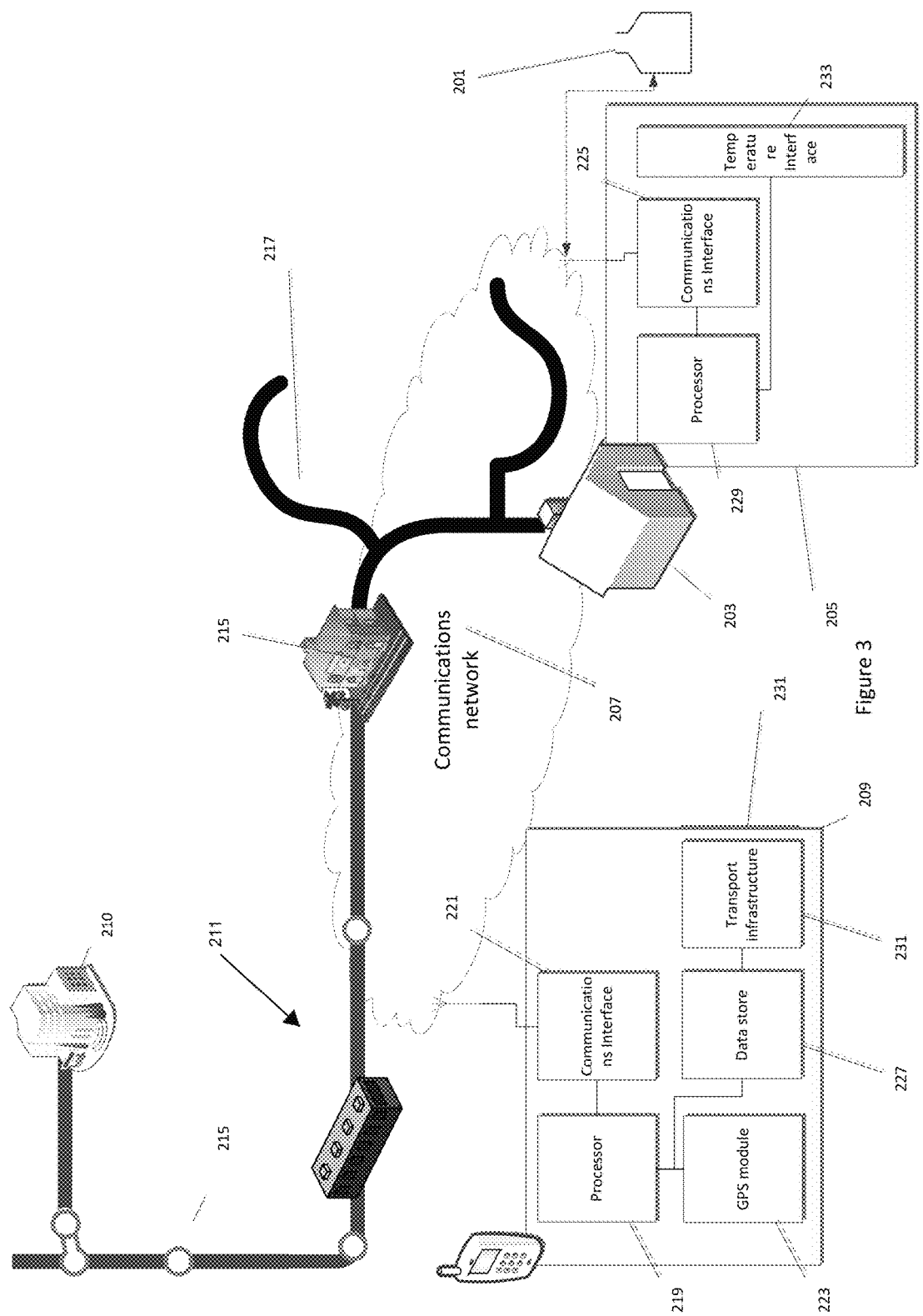

CONTROLLER FOR A THERMAL APPLIANCE

The present disclosure relates to a controller, a mobile device and a process for controlling a thermal appliance such as heating or cooling systems, for example systems such as may be used to heat or cool domestic or commercial premises.

Conventional heating and cooling systems may operate by a user manually switching the heating or cooling system off or on. For example, a user may manually turn a heating or cooling system on when desired depending on the ambient temperature of an area in a house. In some conventional heating and cooling systems, a timer program may be used, so that for example the heating is scheduled to automatically turn on and off at set times in the day. However, it is common for such systems to be left on for longer than necessary. Therefore, such conventional systems may be considered inefficient, and a more efficient heating or cooling system is desired. Wireless thermostats are one way to provide convenient control of thermal appliances.

In one aspect there is provided a controller for a thermal appliance configured to heat or cool an area of a premises, the controller comprising:
- a communications interface, configured to communicate over a communications network;
- a data store comprising information regarding a transport infrastructure; and
- a processor coupled to the data store and to the first communications interface and configured to:
  obtain an estimate of the time for the thermal appliance to heat or cool the area to a selected temperature;
  identify at least one wireless mobile device connectable to the communications network;
  store, in the data store, an association between the, or each, at least one mobile device, a connection status and a location relative to the transport infrastructure of the, or each, corresponding mobile device;
  monitor the location and connection status of the, or each, at least one mobile device, and in the event that the location and/or connection status changes, to update the corresponding stored association;
  to obtain an estimate of the time for a user carrying a mobile device to return to the premises via the transport infrastructure based on the stored association and stored information regarding the transport infrastructure;
  wherein the processor is further configured to:
    determine that a user is returning to the premises in the event that the stored association indicates that the location of at least one mobile device is in the transport infrastructure and that the, or each, at least one mobile device has lost connection with the communications network, and
    in the event that it is selected that a user is returning to the premises, control the thermal appliance based on the estimate of the time for the user to return to the premises and the estimate of the time for the thermal appliance to heat or cool the area to the selected temperature, such that the area is at the selected temperature when the user returns to the premises.

It will be understood that in the transport infrastructure means in the vicinity of the transport infrastructure. For example, a location within 100 m, within 50 m, within 25 m of the transport infrastructure means in the transport infrastructure. In some examples, in the transport infrastructure means within a range of the transport infrastructure corresponding to the error margin of the means providing the location. For example, if the location is determined using GPS, and the GPS has an accuracy of ±5 m, then in the transport infrastructure means within 5 m of the transport infrastructure.

The controller may be configured to store, in the data store, a second association between the, or each, mobile device, a location, the time for a user to return to the premises from that location and the route taken in the transport infrastructure between that location and the premises, and to update the second association with the time for a user to return to the premises and the route taken after completion of a journey. The processor may be configured to use the second association in estimating the time for a user carrying the mobile device to return to the premises, such that the controller learns from the behaviour of the user.

In another aspect there is provided a controller for a thermal appliance configured to heat or cool an area of a premises, the controller comprising:
- a communications interface, configured to communicate over a communications network;
- a data store comprising information regarding a transport infrastructure; and
- a processor coupled to the data store and to the first communications interface and configured to:
  obtain an estimate of the time for the thermal appliance to heat or cool the area to a selected temperature;
  identify at least one wireless mobile device connectable to the communications network;
  store, in the data store, a first association between the, or each, mobile device and a location relative to the transport infrastructure of the, or each, corresponding mobile device;
  store, in the data store, a second association between the, or each, unique identifier, a location in the transport infrastructure, the time for a user previously to return to the premises from that location and the route taken in the transport infrastructure between that location and the premises, and to update the second association upon completion of a journey to the premises in the transport infrastructure;
  monitor the location of the, or each, at least one mobile device, and in the event that the location changes, to update the corresponding stored first association;
  to obtain an estimate of the time for a user carrying a mobile device to return to the premises via the transport infrastructure based on the stored first and second associations and stored information regarding the transport infrastructure;
  wherein the processor is further configured to:
    determine that a user is returning to the premises in the event that the stored first association indicates that the location of the, or each, at least one mobile device is in the transport infrastructure, and
    in the event that it is selected that a user is returning to the premises, control the thermal appliance based on the estimate of the time for the user to return to the premises and the estimate of the time for the thermal appliance to heat or cool the area to the selected temperature, such that the area is at the selected temperature when the user returns to the premises.

The stored first association may comprise a connection status of the, or each, at least one mobile device, and the processor may be configured to monitor the connection status of the, or each, at least one mobile device, and in the event that the connection status changes, to update the corresponding stored first association, and determine that a user is returning to the premises.

Determining that a user is returning to the premises may comprise making a determination in the event that the at least one mobile device has lost connection with the communications network. Determining that a user is returning to the premises may comprise making a determination in the event that the at least one mobile device has connected to a different communications network and/or to a different access point.

The processor may be configured to determine that the user is returning to the premises in the event that the stored association or associations indicate that the at least one mobile device has travelled past a selected landmark in the transport infrastructure.

Estimating the time for a user to return to the premises may comprise predicting a route that a user will take from their location with respect to the transport infrastructure, to the premises, from among a plurality of routes possible on the transport infrastructure, based on the stored association or associations.

Estimating the time for a user to return to the premises may comprise the processor obtaining data regarding current and/or abnormal delays and/or traffic on the predicted route that will be taken by a user, and using the data to obtain the estimate.

The processor may be configured to determine that the user is returning to the premises in the event that the at least one mobile device is travelling at a speed above a selected speed on the transport infrastructure.

The processor may be configured to update the obtained estimate of the time for the user to return to the premises based on an update of the location, to obtain a real-time estimate of the time for the user to return to the premises.

The processor may be configured to control the thermal appliance via the communications network.

In another aspect there is provided a process comprising:
estimating the time for a thermal appliance to heat or cool an area of a premises; identifying, through a communications interface configured to communicate over a communications network, at least one wireless mobile device connectable to the communications network;
obtaining a location of the, or each, at least one mobile device, wherein the location comprises a location of the, or each, mobile device relative to a transport infrastructure;
storing, in a data store, information regarding a transport infrastructure and an association between the, or each, at least one mobile device, a connection status and a location of the, or each, corresponding mobile device relative to the transport infrastructure;
monitoring the location and connection status of the, or each, at least one mobile device;
updating the stored association in the event that the location and/or connection status changes;
estimating the time for a user carrying a mobile device to return to the premises via the transport infrastructure based on the stored association and the stored information regarding the transport infrastructure;
determining that a user is returning to the premises based on the stored association indicating that the location of at least one mobile device is in the transport infrastructure and that the at least one mobile device has lost connection with the communications network; and
controlling the thermal appliance based on the estimate of the time for the user to return to the premises and the estimated time for the thermal appliance to heat or cool the area, in the event that it is selected that a user is returning to the premises, such that the area is at the selected temperature when the user returns to the premises.

The process may comprise:
storing a second association between the, or each, unique identifier, a location, the time for a user previously to return to the premises from that location and the route taken in the transport infrastructure between that location and the premises, and updating the second association with the time for a user to return to the premises and the route taken after completion of a journey; wherein
determining that a user is returning to the premises comprises making a determination based on the second association.

In another aspect there is provided a process comprising:
estimating the time for a thermal appliance to heat or cool an area of a premises;
identifying, through a communications interface configured to communicate over a communications network, at least one wireless mobile device connectable to the communications network;
obtaining a location of the, or each, at least one mobile device, wherein the location comprises a location of the, or each, mobile device relative to a transport infrastructure;
storing, in a data store, information regarding a transport infrastructure, a first association between the, or each, at least one mobile device, a connection status and a location of the, or each, corresponding mobile device relative to the transport infrastructure;
storing a second association between the, or each, unique identifier, a location on the transport infrastructure, the time for a user previously to return to the premises from that location and the route taken on the transport infrastructure between that location and the premises;
monitoring the location and connection status of the, or each, at least one mobile device;
updating the stored first association in the event that the location changes;
updating the stored second association with the time for a user to return to the premises and the route taken in the transport infrastructure upon completion of a journey;
estimating the time for a user carrying a mobile device to return to the premises via the transport infrastructure based on the stored first and second associations and stored information regarding the transport infrastructure;
determining that a user is returning to the premises based on the stored first association; and
controlling the thermal appliance based on the estimate of the time for the user to return to the premises and the estimated time for the thermal appliance to heat or cool the area, in the event that it is selected that a user is returning to the premises, such that the area is at the selected temperature when the user returns to the premises.

The stored first association may comprise a connection status of the, or each, at least one mobile device, and the process may further comprise:
monitoring the connection status of the, or each, at least one mobile device;
updating the corresponding stored first association in the event that the connection status changes; and determining that a user is returning to the premises in the event that the connection status changes.

Determining that a user is returning to the premises may comprise making a determination in the event that the at least one mobile device has lost connection with the communications network.

A user may be selected to be returning to the premises in the event that the stored first association indicates that the user has travelled past a selected landmark on the transport infrastructure.

Estimating the time for a user to return to the premises may comprise predicting a route that a user will take on the transport infrastructure from their location relative to the transport infrastructure from among a plurality of routes possible on the transport infrastructure, based on the stored association or associations.

Estimating the time for a user to return to the premises may comprise obtaining data regarding current and/or abnormal delays and/or traffic on the predicted route that will be taken by a user, and using that data to obtain the estimate.

A user may be selected to be returning to the premises in the event that the user is travelling at a speed above a selected speed on the transport infrastructure.

Updating the second association may comprise updating the second association with the time for a user to return to the premises and the route taken, such that future processes use the information for future estimations of the time to return to the premises.

The process may further comprise updating the obtained estimate of the time for the user to return to the premises based on an update of the location, to obtain a real-time estimate of the time for the user to return to the premises.

Controlling the thermal appliance may comprise controlling the thermal appliance over the communications network.

Embodiments of the disclosure will now be described, by way of example only, with reference to the accompanying drawings, in which:

FIG. 3 shows a schematic diagram of an alternative system for controlling the operation of a thermal appliance.

Embodiments of the disclosure relate to the control of a thermal appliance for heating or cooling an area of a premises based on a determination of whether a user is returning to a premises, the estimated time for the thermal appliance to heat or cool the area to the selected temperature, and an estimate of the time for the user to reach the premises.

In one example of the disclosure a controller identifies a mobile device connected to a communications network, obtains a location of the device relative to a transport infrastructure, determines that a user carrying the device is returning to the premises based on the user's location relative to a transport infrastructure and a loss of connection of the device with the communications network. The controller estimates the time for a user carrying the device to return to a premises, and estimates the time for the thermal appliance to heat or cool an area of the premises to the selected temperature, and controls the thermal appliance such that the area is at the selected temperature when the user returns to the premises.

In another example of the disclosure a mobile communications device is configured to obtain an estimate of the time for a user to return to a premises from its current location on a transport infrastructure, and to obtain an estimate of the time for a thermal appliance to heat or cool an area of a premises to a selected temperature. The mobile device determines that a user of the device is returning to the premises based on the user's previous behaviour in the transport infrastructure, and controls the thermal appliance such that the area is at the selected temperature when the user returns to the premises.

In the event that it is selected that the user is returning to the premises, the device is configured to control operation of the thermal appliance based on an estimate of the time for the thermal appliance to heat an area of the premises and an estimate of the time for a user to return to the premises.

Figure 1:
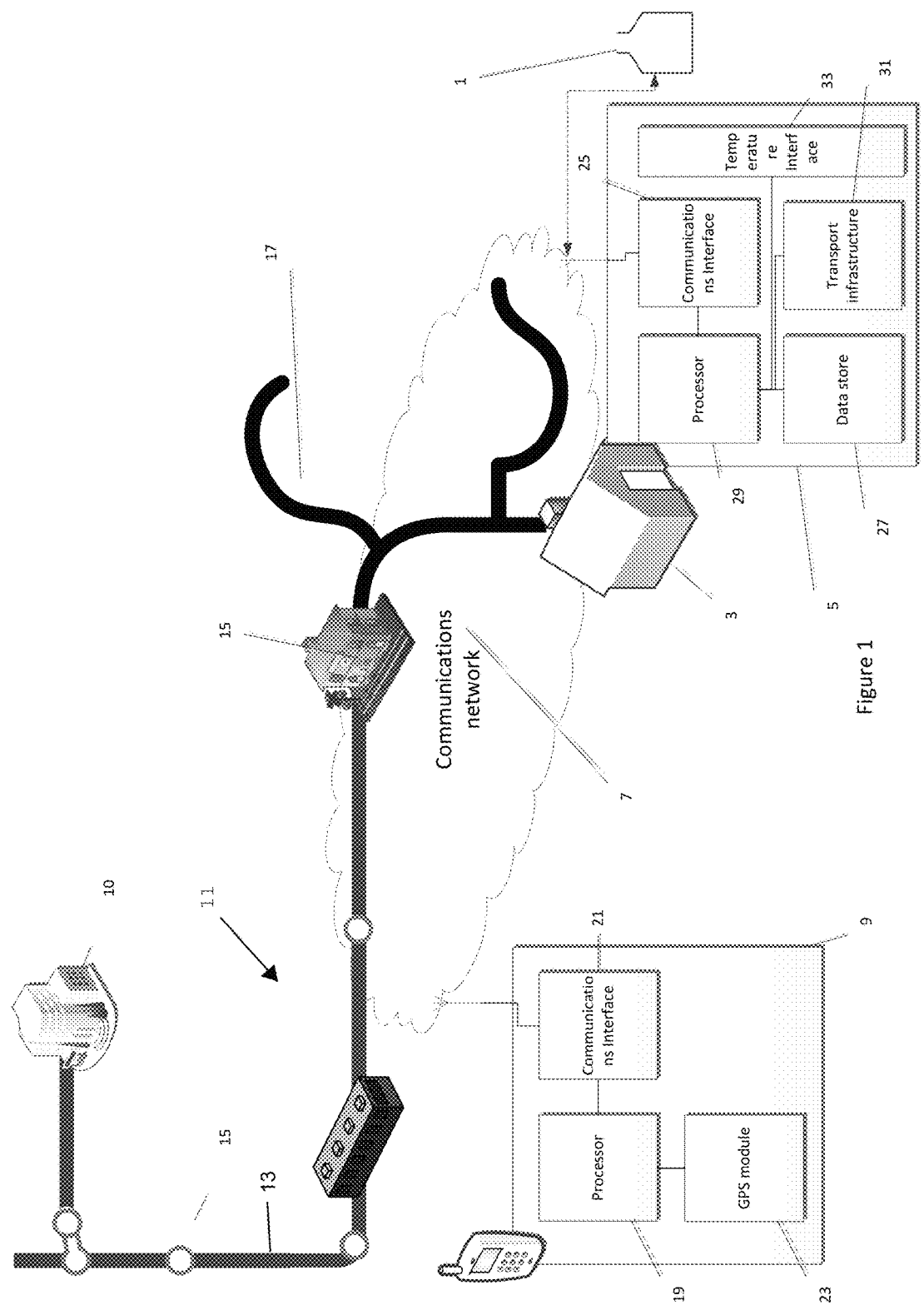
FIG. 1 shows a schematic diagram of a system for controlling the operation of a thermal appliance.

One such example will now be discussed with reference to FIG. 1. FIG. 1 illustrates a system for controlling the operation of a thermal appliance 1 configured to heat or cool an area of a premises 3.

The system comprises a controller 5, a mobile device 9 and a telecommunications network 7. A transport infrastructure 11 connects a user's workplace, such as an office 10, to the premises 3. The transport infrastructure 11 comprises a rail network 13 with a plurality of stations 15, and a road network 17 connecting a station 15 with the premises 3. The telecommunications network 7 extends to cover the user's office 10 and the premises 3. However, the telecommunications network 7 does not extend to cover all parts of the transport infrastructure 11, for example where these parts of the transport infrastructure 11 are based underground, for example an underground rail network.

The mobile device 9 comprises a processor 19 coupled to a communications interface 21. The mobile device 21 also comprises a GPS module 23 coupled to the processor 19.

The controller 5 is associated with the premises 3 and the thermal appliance 1, and comprises a communications interface 25, a temperature sensor 33 and a data store 27 all coupled to a processor 29. The data store 27 comprises information 31 regarding the transport infrastructure 11.

The mobile device 9 and the controller 5 are operable to communicate via the telecommunications network 7. The controller 5 is operable to communicate with and control the thermal appliance 1 via the communications interface 25, for example by sending a trigger signal to the thermal appliance 1.

The controller 5 is configured to sense, via the temperature sensor 33, the ambient temperature of the area of the premises 3 which the thermal appliance 1 heats or cools. The processor 29 of the controller 5 is configured to provide an estimate of the time for the thermal appliance 1 to heat or cool the area to a selected temperature.

The GPS module 23 of the mobile device 9 is configured to provide location information for the mobile device 9. The mobile device 9 is operable to send the location information via the telecommunications network 7 to the controller 5.

The controller 5 is configured to identify the mobile device 9 and monitor and store in the data store 27 an association between the mobile device 9, a connection status of the mobile device 9 with the telecommunications network 7 and a location relative to the transport infrastructure 11 of the mobile device 9. The controller 5 is configured to obtain information indicating the presence of a connection of the mobile device 9 with the telecommunications network 7.

The processor 29 of the controller 5 is configured to provide an estimate of the time for a user carrying the mobile device 9 to return to the premises 3 via the transport infrastructure 11 based on the stored association and stored information regarding the transport infrastructure 11.

The processor 29 of the controller 5 is configured to determine that a user is returning to the premises 3. The determination is based on the stored association between the mobile device 9, the location of the mobile device 9 relative to the transport infrastructure 11, and the connection status of the mobile device 9 with the telecommunications network 7.

Figure 2:
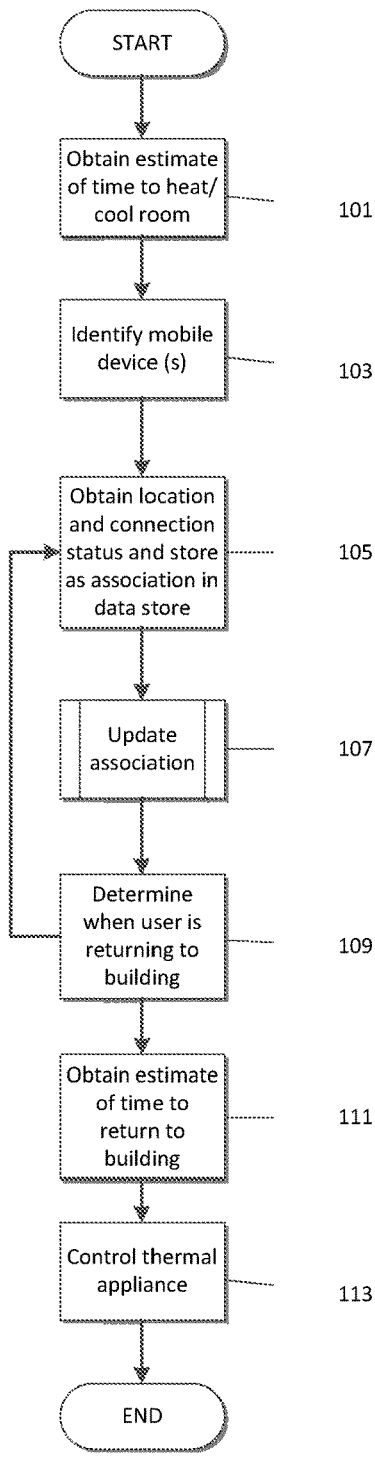
FIG. 2 shows an example flow diagram for a process for controlling the operation of a thermal appliance for use with the system of FIG. 1.

To assist in understanding the present disclosure, FIG. 2 shows a flow chart illustrating a method of operation, which can be applied in apparatus similar to that described above with reference to FIG. 1, and in other apparatus.

As illustrated, the processor 29 of the controller 5 estimates 101 the time for the thermal appliance 1 to heat or cool an area of the premises 3 to a selected temperature. The controller 3 identifies 103 the mobile device 9 connectable to the telecommunications network 7, and also obtains and monitors 105 the location relative to the transport infrastructure 11 and connection status of the mobile device 9.

The processor 29 of the controller 5 stores and updates 107 the location relative to the transport infrastructure 11 and the connection status of the mobile device 9 as an association in the data store 27. The processor 29 makes a determination 109 whether the user of the mobile device 9 is returning to the premises 3 based on the stored association. If it is selected that the user is not returning to the premises 3, the process is repeated as illustrated in FIG. 2.

If, however, it is selected that the user is returning to the premises 3, then the processor 29 obtains an estimate of the time for the user to return to the premises 3 via the transport infrastructure 11. The estimate may include the total journey time, for example, from entering a station 15, travelling on the underground rail network 19 and travelling on the road network 17 to the premises 3. The controller 5 uses this estimate of the time to return to the premises 3 and the estimate of the time to heat or cool the area of the premises 3 to the selected temperature to control 113 the thermal appliance 1, such that the temperature of the area of the premises 3 is at the selected temperature when the user returns to the premises 3. The controller 5 may control the thermal appliance 1 by sending a trigger signal via the communications interface 25 to the thermal appliance 1.

The processor 29 determines that the user is returning to the premises 3 in the event that the stored association indicates that the location of the mobile device 9 is in the transport infrastructure 11 and that the device has lost connection with the telecommunications network 7. This may happen, for example, when a user carrying the mobile device 9 leaves the office 10 and walks into an underground rail station 15 to travel home to the premises 3 and consequently loses signal with the telecommunications network 7. A determination of whether the mobile device 9 is in the transport infrastructure 11 will be understood as being a determination of whether the mobile device 9 is in the vicinity of the transport infrastructure 11, for example, within a certain range of a station 15. The range can be adjusted accordingly depending on requirements, but may be in the range of less than 100 m, less than 50 m, less than 25 m.

The controller 5 may be configured to obtain, monitor and store the connection status of the mobile device 9 with the telecommunications network 7 in a number of ways. For example, the controller 5 may be configured to routinely poll the telecommunications network 7. As another example, the mobile device 9 may be configured to send a routine status update message to the controller 5, indicating that the device 9 is connected to the telecommunications network 7. As another example, the telecommunications network 7 may routinely send status update messages to the controller 5.

The controller 5 may be configured to identify 103 other mobile devices connectable to the telecommunications network 7 and identify and monitor their connection status and location, and to take these into account when estimating the time for a user to return to the premises 3, and determining 109 how to control 113 the thermal appliance 1. The controller 5 may be configured to control the thermal appliance 1 based on the shortest estimated time to return to the premises 3 (in other words, when it is estimated that the first user will return to the premises 3).

For example, the controller 5 may identify that there are six mobile devices connectable to the telecommunications network. Each mobile device may have a specific unique identifier or setting selected to enable it to be identified by the controller. For example, each mobile device may be running a custom application that identifies to the controller 5 itself as a mobile device belonging to a particular user or family. Out of the six devices identifier, the controller 5 may determine that two of the devices are returning to the premises 3 because their connection with the telecommunications network 7 has been lost and their location indicates that they are in the transport infrastructure 11. The controller 5 may then obtain an estimate of the time for a user carrying each mobile device 9 to return to the premises 3. The controller 5 may select the shortest estimate to determine control of the thermal appliance 1 such that the temperature of the area is at the selected temperature when the user returns to the premises 3.

In some configurations, the processor 29 of the controller 5 determines that the user is returning to the premises 3 when the connection status changes. The connection status may change when the mobile device 9 switches connection from one network to another network, for example from a mobile telecommunications network to a local area network. For example, the mobile device 9 may connect to a second communications network, for example a Wi-Fi network provided at underground rail station 15, when a user enters the station 15, which would change the status of the connection. In some configurations, the connection status may change when a connection with the mobile telecommunications network 7 is lost.

The controller 5 may be configured to learn from the user's previous behaviour, to provide an adaptive system that more accurately reflects the user's behaviour and hence provide a more accurate estimate of the time to return to the premises 3. For example, the controller 5 may be configured to store, in the data store 27, a second association between the mobile device 9, a location of the mobile device 9 relative to the transport infrastructure 11, the time for a user to return to the premises 3 from that location and the route taken in the transport infrastructure 11 between that location and the premises 3. The controller 5 may then use this second association when estimating the time for the user to return to the premises 3, to provide a more accurate estimate.

For example, in some configurations the controller 5 predicts a route that a user will take to travel from a location to the premises 3 via the transport infrastructure 11. The controller 5 may use this prediction to estimate the time for a user to return to the premises 3. The route may be a route selected from a plurality of routes. In some configurations, the route may be a route that the user has previously taken and that may be stored in the data store 27. In these configurations, the stored second association may comprise the predicted route. In some configurations, the route is a new route that the user has not taken before and the controller 5 predicts to be, for example, the shortest, fastest, or easiest route to the premises 3.

In some configurations, the controller 5 is configured to learn from the user's past behaviour and not rely on the connection status to determine that a user is returning to the premises. In these configurations, the controller 5 may use the location of the mobile device 9 to determine that the user is in the transport infrastructure 11 and compare this to the user's previous behaviour. For example, the controller 5 may further obtain information regarding the time of day a user previously made a journey, the starting and end locations of the journey and the route taken. The controller may then compare the user's current activities (for example based on the location of the mobile device 9 and the time of day) to determine that the user is making the same journey, and hence determine that the user is returning to the premises 3.

In some configurations, the controller 5 is configured to obtain an estimate of the speed the user is travelling at in the transport infrastructure 11. For example, the controller 5 may monitor the location of the mobile device 9 at regular intervals, or record the location of the mobile device 9 along with the time of that location. The controller 5 may be configured to determine that the user is returning to the premises 3 in the event that the location of the mobile device 9 and its estimated speed indicate that the mobile device 9 is travelling at a speed above a selected speed in the transport infrastructure.

In some configurations, the controller 5 is configured to determine that a user is returning to the premises 3 in the event that it is selected that the mobile device has travelled past a selected landmark in or relative to the transport infrastructure 11. For example, the stored association between the mobile device 9 and the location may indicate that the user has travelled past a selected station 15 on the way back to the premises. For example, the controller 5 may be configured to determine that a user is returning to the premises 3 only when they travel past a station that is on a route between the office 10 and the premises 3.

The controller 5 may also be configured to obtain information likely to affect the time for a user to return to the premises 3 and use this information in obtaining an estimate of the time for a user to return to the premises 3. For example, the controller may be configured to obtain information regarding traffic in the transport infrastructure 11, current delays on the transport infrastructure 11 or abnormal delays on the transport infrastructure 11, for example road or rail network closures.

The controller 5 may be configured to routinely obtain estimates of the time for a user to return to the premises 3 from their location. For example, as the user is travelling to the premises 3, the controller 5 may routinely obtain estimates of the time to return to the premises 3. The controller 5 may compare these estimates with a previous estimate, to adjust control of the thermal appliance 1 accordingly so that the temperature of the area is at the selected temperature when the user returns to the premises 3. By routinely obtaining these estimates, the controller 5 can provide an adaptive system that takes into account, for example, unexpected delays or if the user stops or alters their journey (for example, to pop into the shops, or to stop off at a pub on the way home).

As illustrated in FIG. 3, in some configurations the obtaining 105, updating 107, determining and estimating 111 are performed by the mobile device 209. As shown in the system of FIG. 3, the mobile device 209 comprises a communications interface 221, a data store 227 and a GPS module 223 coupled to a processor 219. The data store 227 comprises information regarding a transport infrastructure 211. The system further comprises a controller 205, comprising a temperature sensor 233 and a communications interface 225 coupled to a processor 229. The communications interfaces 225 and 221 are couplable with a telecommunications network 207 and the controller 205 is operable to communicate with a thermal appliance 201.

In these configurations, the mobile device 209 optionally identifies other mobile devices connectable to the telecommunications network 207. Mobile device 209 obtains and monitors the location relative to the transport infrastructure 111 and connection status of the mobile device or devices, and stores and updates these as an association in the data store 227 of the mobile device 209. The processor 219 determines whether a user is returning to the premises 203 and estimates the time for the user to return to the premises 203. The mobile device 209 sends a signal to the controller 205 in the event that it is selected that the user is returning to the premises to control the thermal appliance 201.

In some configurations the mobile device 209 also obtains an estimate of the time for the thermal appliance 201 to heat or cool the area to the selected temperature. The mobile device 209 may wait to send a signal to the controller 205 based on the estimate of the time for the thermal appliance 201 to heat or cool the area to the selected temperature, and send a signal when it has calculated that the thermal appliance needs to be controlled such that the temperature of the area will be at the selected temperature when the user returns to the premises.

In some configurations, the controller 5, 205 communicates with the thermal appliance 1, 201 by other means. For example, the controller 5, 205 may comprise a direct connection with the thermal appliance 1, for example by a cable. In some configurations the controller 5, 205 may communicate with the thermal appliance 1, 201 over a network different to the telecommunications network 7, 207. For example, the controller 5, 205 may communicate with the thermal appliance 1, 201 over a local area network, for example a Wi-Fi network, a Zig-Bee® network or a Bluetooth® connection.

In some configurations, the mobile device 9, 209 communicates with the controller 9, 209 over a plurality of networks. The mobile device 9, 209 may communicate with the controller via the Internet.

In some configurations the controller 9, 209 may not have a temperature sensor 33, 233. In these configurations, the controller 9, 209 may be coupled to other means for measuring the temperature, for example a thermostat. The thermostat may provide the estimate of the time for the thermal appliance 1, 201 to heat or cool the area to the selected temperature.

In some configurations the mobile device 9, 209 does not have a GPS module. Additionally or alternatively, location information of the mobile device 9, 209 may be obtained by other means known in the art. For example, the location of the mobile device 9, 209 may be selected via triangulation techniques or via connections to local area networks (for example Wi-Fi networks).

In some configurations, location information of the mobile device 9, 209 is provided by a user paying to use the transport infrastructure 11, 211 at a location in the transport infrastructure 11, 211 or other means to register the user's presence in the transport infrastructure 11, 211. For example, if a user uses a contactless payment system, for example an Oyster card or Near Field Communication (NFC) payment system, then the user's location must be in the transport infrastructure 11, 211 and thus the mobile device 9, 209 is also inferred to be in the transport infrastructure 11, 211. In some configurations, the mobile device 9, 209 provides a contactless payment system for the transport infrastructure 11, 211 and therefore payment using the mobile device 9, 209 indicates its presence in the transport infrastructure 11, 211.

In some configurations, the selected temperature is set by a user and stored by the data store 27, 227 of the controller 5, 205 when the user is at the premises 3, 203. In some configurations, the selected temperature is set by a user remotely, for example via a web application interface, or via the mobile device 9, 209 and may optionally be sent to the controller 9, 209 via the telecommunications network 7, 207 or via the internet.

In the context of the present disclosure other examples and variations of the apparatus and methods described herein will be apparent to a person of skill in the art.

The invention claimed is:

1. A controller for a thermal appliance configured to heat or cool an area of a premises, the controller comprising:
   a communications interface, configured to communicate over a communications network;
   a data store comprising information regarding a transport infrastructure; and
   a processor coupled to the data store and to the communications interface and configured to:
     obtain an estimate of the time for the thermal appliance to heat or cool the area to a selected temperature;
     identify at least one wireless mobile device connectable to the communications network;
     store, in the data store, an association between the, or each, at least one mobile device, a connection status of the mobile device with the communications network and a location relative to the transport infrastructure of the, or each, corresponding mobile device;
     monitor the location and connection status of the, or each, at least one mobile device, and in the event that the location and/or connection status changes, to update the corresponding stored association;
     to obtain an estimate of the time for a user carrying a mobile device to return to the premises via the transport infrastructure based on the stored association and stored information regarding the transport infrastructure;
   wherein the processor is further configured to:
     determine that a user is returning to the premises in the event that the stored association indicates that the location of at least one mobile device is in the transport infrastructure and that the, or each, at least one mobile device has lost connection with the communications network, and
     in the event that it is determined that a user is returning to the premises, control the thermal appliance based on the estimate of the time for the user to return to the premises and the estimate of the time for the thermal appliance to heat or cool the area to the selected temperature, such that the area is at the selected temperature when the user returns to the premises.

2. The controller of claim 1 wherein the controller is configured to store, in the data store, a second association between the, or each, mobile device, a location, the time for a user to return to the premises from that location and the route taken in the transport infrastructure between that location and the premises, and to update the second association with the time for a user to return to the premises and the route taken after completion of a journey, and wherein the processor is configured to use the second association in estimating the time for a user carrying the mobile device to return to the premises, such that the controller learns from the behaviour of the user.

3. A controller for a thermal appliance configured to heat or cool an area of a premises, the controller comprising:
   a communications interface, configured to communicate over a communications network;
   a data store comprising information regarding a transport infrastructure; and
   a processor coupled to the data store and to the communications interface and configured to:
     obtain an estimate of the time for the thermal appliance to heat or cool the area to a selected temperature;
     identify at least one wireless mobile device connectable to the communications network;
     store, in the data store, a first association between the, or each, mobile device and a location relative to the transport infrastructure of the, or each, corresponding mobile device;
     store, in the data store, a second association between the, or each, mobile device, a location in the transport infrastructure, the time for a user previously to return to the premises from that location and the route taken in the transport infrastructure between that location and the premises, and to update the second association upon completion of a journey to the premises in the transport infrastructure;
     monitor the location of the, or each, at least one mobile device, and in the event that the location changes, to update the corresponding stored first association;
     to obtain an estimate of the time for a user carrying a mobile device to return to the premises via the transport infrastructure based on the stored first and second associations and stored information regarding the transport infrastructure;
   wherein the processor is further configured to:
     determine that a user is returning to the premises in the event that the stored first association indicates that the location of the, or each, at least one mobile device is in the transport infrastructure, and in the event that it is determined that a user is returning to the premises, control the thermal appliance based on the estimate of the time for the user to return to the premises and the estimate of the time for the thermal appliance to heat or cool the area to the selected temperature, such that the area is at the selected temperature when the user returns to the premises.

4. The controller of claim 3, wherein the stored first association comprises a connection status of the, or each, at least one mobile device to the communications network, and the processor is configured to monitor the connection status of the, or each, at least one mobile device, and in the event that the connection status changes, to update the corresponding stored first association, and determine that a user is returning to the premises.

5. The controller of claim 3 wherein determining that a user is returning to the premises comprises making a determination in the event that the at least one mobile device has lost connection with the communications network.

6. The controller of claim 3 wherein the processor is configured to determine that the user is returning to the premises in the event that the stored association or associations indicate that the at least one mobile device has travelled past a selected landmark in the transport infrastructure.

7. The controller of claim 3 wherein estimating the time for a user to return to the premises comprises at least one of:
   (i) predicting a route that a user will take from their location with respect to the transport infrastructure, to the premises, from among a plurality of routes possible on the transport infrastructure, based on the stored association or associations, and
   (ii) obtaining data regarding current and/or abnormal delays and/or traffic on the predicted route that will be taken by a user, and using the data to obtain the estimate.

8. The controller of claim 3 wherein the processor is configured to:
   (i) determine that the user is returning to the premises in the event that the at least one mobile device is travelling at a speed above a selected speed on the transport infrastructure, and/or
   (ii) update the obtained estimate of the time for the user to return to the premises based on an update of the location, to obtain a real-time estimate of the time for the user to return to the premises, and/or
   (iii) control the thermal appliance via the communications network.

9. A process comprising:
   estimating the time for a thermal appliance to heat or cool an area of a premises;
   identifying, through a communications interface configured to communicate over a communications network, at least one wireless mobile device connectable to the communications network;
   obtaining a location of the, or each, at least one mobile device, wherein the location comprises a location of the, or each, mobile device relative to a transport infrastructure;
   storing, in a data store, information regarding a transport infrastructure and an association between the, or each, at least one mobile device, a connection status and a location of the, or each, corresponding mobile device relative to the transport infrastructure;
   monitoring the location and connection status of the, or each, at least one mobile device with the communications network;
   updating the stored association in the event that the location and/or connection status changes;
   estimating the time for a user carrying a mobile device to return to the premises via the transport infrastructure based on the stored association and the stored information regarding the transport infrastructure;
   determining that a user is returning to the premises based on the stored association indicating that the location of at least one mobile device is in the transport infrastructure and that the at least one mobile device has lost connection with the communications network; and
   controlling the thermal appliance based on the estimate of the time for the user to return to the premises and the estimated time for the thermal appliance to heat or cool the area, in the event that it is determined that a user is returning to the premises, such that the area is at the selected temperature when the user returns to the premises.

10. The process of claim 9 comprising:
    storing a second association between the, or each, mobile device, a location, the time for a user previously to return to the premises from that location and the route taken in the transport infrastructure between that location and the premises, and updating the second association with the time for a user to return to the premises and the route taken after completion of a journey; wherein
    determining that a user is returning to the premises comprises making a determination based on the second association.

11. A process comprising:
    estimating the time for a thermal appliance to heat or cool an area of a premises;
    identifying, through a communications interface configured to communicate over a communications network, at least one wireless mobile device connectable to the communications network;
    obtaining a location of the, or each, at least one mobile device, wherein the location comprises a location of the, or each, mobile device relative to a transport infrastructure;
    storing, in a data store, information regarding a transport infrastructure, a first association between the, or each, at least one mobile device, a connection status of the mobile device with the communications network and a location of the, or each, corresponding mobile device relative to the transport infrastructure;
    storing a second association between the, or each, mobile device, a location on the transport infrastructure, the time for a user previously to return to the premises from that location and the route taken on the transport infrastructure between that location and the premises;
    monitoring the location and connection status of the, or each, at least one mobile device;
    updating the stored first association in the event that the location changes;
    updating the stored second association with the time for a user to return to the premises and the route taken in the transport infrastructure upon completion of a journey;
    estimating the time for a user carrying a mobile device to return to the premises via the transport infrastructure based on the stored first and second associations and stored information regarding the transport infrastructure;
    determining that a user is returning to the premises based on the stored first association; and
    controlling the thermal appliance based on the estimate of the time for the user to return to the premises and the estimated time for the thermal appliance to heat or cool the area, in the event that it is determined that a user is returning to the premises, such that the area is at the selected temperature when the user returns to the premises.

12. The process of claim 11 wherein the stored first association comprises a connection status of the, or each, at least one mobile device, the process further comprising:
    monitoring the connection status of the, or each, at least one mobile device with the communications network;
    updating the corresponding stored first association in the event that the connection status changes; and
    determining that a user is returning to the premises in the event that the connection status changes.

13. The process of claim 11 or 12 wherein determining that a user is returning to the premises comprises making a determination in the event that the at least one mobile device has lost connection with the communications network.

14. The process of claim 11 wherein a user is selected to be returning to the premises in the event that the stored first association indicates that the user has travelled past a selected landmark on the transport infrastructure.

15. The process of claim 11 wherein estimating the time for a user to return to the premises comprises predicting a route that a user will take on the transport infrastructure from their location relative to the transport infrastructure from among a plurality of routes possible on the transport infrastructure, based on the stored association or associations.

16. The process of claim 15 wherein estimating the time for a user to return to the premises comprises obtaining data regarding current and/or abnormal delays and/or traffic on the predicted route that will be taken by a user, and using that data to obtain the estimate.

17. The process of claim 11, wherein a user is determined to be returning to the premises in the event that the user is travelling at a speed above a selected speed on the transport infrastructure.

18. The process of claim 11 wherein updating the second association comprises updating the second association with the time for a user to return to the premises and the route taken, such that future processes use the information for future estimations of the time to return to the premises.

19. The process of claim 11 further comprising updating the obtained estimate of the time for the user to return to the premises based on an update of the location, to obtain a real-time estimate of the time for the user to return to the premises.

20. The process of claim 11 wherein controlling the thermal appliance comprises controlling the thermal appliance over the communications network.

* * * * *